United States Patent [19]

Tseng

[11] Patent Number: 4,475,340

[45] Date of Patent: Oct. 9, 1984

[54] INTERNAL COMBUSTION ENGINE HAVING AN EXHAUST GAS TURBINE AND FUEL PREHEATING USING EXHAUST GAS HEAT AND METHOD OF OPERATION THEREOF

[76] Inventor: Ching-Ho Tseng, c/o Mr. Chung-Hsien Chen, 7307 Caracas Dr., Houston, Tex. 77083

[21] Appl. No.: 414,599

[22] Filed: Sep. 3, 1982

[51] Int. Cl.³ .................. F02B 35/00; F02B 41/10
[52] U.S. Cl. ........................ 60/598; 60/315; 123/557; 415/68; 415/92
[58] Field of Search .................. 60/315, 598, 624; 123/557

[56] References Cited

U.S. PATENT DOCUMENTS

| | | | |
|---|---|---|---|
| 1,006,907 | 10/1911 | Buchi | 60/598 X |
| 1,901,381 | 3/1933 | Smith | 60/315 |
| 2,240,311 | 4/1941 | Mills | 123/557 X |
| 3,478,727 | 11/1969 | Marcoux | |
| 3,692,002 | 9/1972 | Williams | |

*Primary Examiner*—Michael Koczo
*Attorney, Agent, or Firm*—Kenneth H. Johnson

[57] ABSTRACT

A power system is provided which consists of an internal combustion engine, a compressor to compress the air used in operating the engine, a pair of heat exchangers wherein the fuel for operating the engine is preheated by exhaust gases wherein the fuel is contacted indirectly, first in a low temperature zone with exhaust gas from a high temperature zone then contacted indirectly with the exhaust gases in the high temperature zone, wherein the exhaust gases are preferably boosted in velocity between the high temperature zone and the low temperature by a screw type booster fan and wherein the exhaust gases recovered from the low temperature zone are then preferably passed through one or more turbines to further recover energy.

12 Claims, 16 Drawing Figures

INTERNAL COMBUSTION ENGINE HAVING AN EXHAUST GAS TURBINE AND FUEL PREHEATING USING EXHAUST GAS HEAT AND METHOD OF OPERATION THEREOF

BACKGROUND OF THE INVENTION

1. Field of the Invention

The present invention relates to the method and apparatus for improving the fuel efficiency of gasoline internal combustion engines and improved energy recovery, in particular in rotary power plant systems.

2. Related Art

There is voluminous art relating to the subject matter of the present invention and any attempt to select specific examples of that art would be superfluous. However, two references cited by the inventor in copending application Ser. No. 160,628 filed June 18, 1980, which are relevant are:

U.S. Pat. No. 3,692,002 to Williams issued Sept. 19, 1972, which discloses a rotary internal combustion engine with pivotal sleeve valves driven by a cam, and pre-compressed fuel injection; and U.S. Pat. No. 3,478,727 to Marcoux, issued Nov. 18, 1969, which discloses a rotary combustion engine with dual intake ports, dual chambers and pre-compression of combustion gases.

In every internal combustion engine, a great deal of energy is lost by several routes. The first and most obvious is mechanical friction loss and is not the subject matter of this invention, except in regard to the rotary engine which may have more mechanical advantage than reciprocating piston engines. A second and also obvious energy loss is the exothermic energy of combustion which along with frictional heat is normally dispensed by cooling means such as radiators, cooling vanes and the like. A third less obvious energy loss, however, one that is widely studied is the incomplete or inadequate combustion of the hydrocarbon fuels in the engine.

The present invention addresses the latter two problems or sources of energy. It is a feature of the present invention that it is a combination of elements directed to heat recovery and improved combustion. It is an advantage of the present invention that means are provided to obtain the combination of elements and the improvement of energy recovery and utilization in internal combustion engines. These and other features and advantages will become apparent from the following descriptions.

SUMMARY OF THE INVENTION

Briefly, the invention comprises a system and apparatus for improving the operating efficiency of internal combustion engines, and, in particular, rotary engines. This is obtained in the system in two ways. First, by supplying the engine with overpressured air and preheated fuel (e.g., gasoline), which is obtained by using the waste heat from the engine operation, and, secondly, by recovering the compression energy of the exhaust gases.

In the following description, similar elements may be designated with the same numbers. It should be appreciated the specific embodiments are to illustrate the invention and are not intended to limit its scope.

DETAILED DESCRIPTION OF THE INVENTION AND PREFERRED EMBODIMENTS

Figure 1:
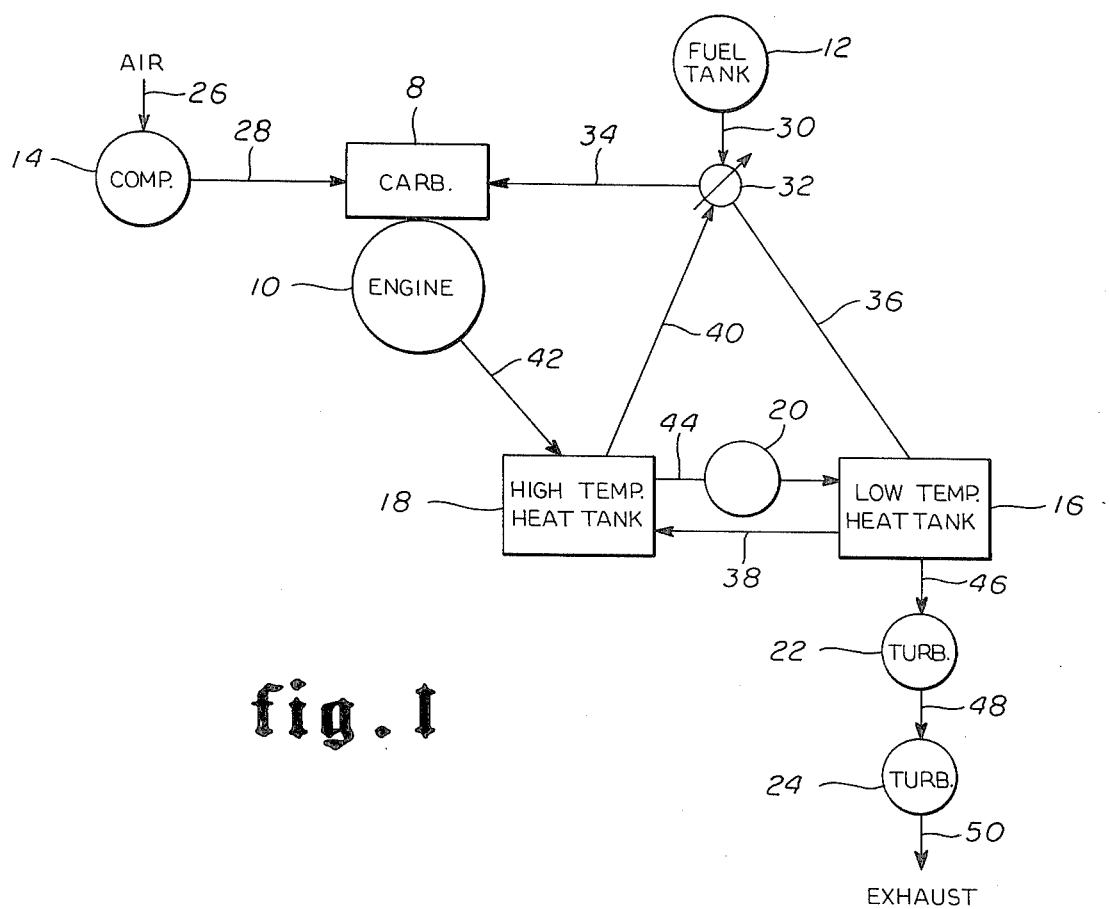
FIG. 1 is a schematic representation of a complete system according to the present invention.

Referring to FIG. 1., the overall system of the present invention is schematically illustrated. It should be appreciated that appertinent components such as fans, air filters, ignition systems and the like are omitted but would be a part of any operational system and would be conventional with the specific engine and components.

Internal combustion engine (either a piston engine or rotary engine) 10 is operationally connected to compressor 14 via line 28 and to fuel tank 12 via line 30, valve 32 and line 34. The air and fuel would mix in an appropriate mixing chamber, such as a carburetor 8 prior to entry into the firing chamber (s) (not shown) of engine 10.

The engine can be a piston engine or a rotary type engine. The compressor 14 has an air intake 26, and can be driven by an independent motor (not shown) either initially or continuously. Once in operation the compressor 14 can be powered by the engine 10, as will be demonstrated hereafter. It is also understood that the engine 10 can be initially operated without the compressor, with the compressor being brought into operation after the initial start up.

The fuel from tank 12 initially is preferably fed through valve 32, line 34, and into engine 10 (after appropriate mixing with air) and hence into the combustion chamber(s) (not shown) for operation of the engine. In the initial start up of the engine, the engine and the system may operate as a conventional system. However, it is not essential that start up proceed from a conventional engine operation with a switch over to improved system to be described hereafter.

By operating the air compressor 14 by a separate power source (not shown) and by supplying heat to the fuel by an outside source (not shown) the engine can begin operation under the high efficiency conditions which the present system provides during operation.

The fuel tank 12 is connected via line 30 and valve 32 to be able to direct the fuel (e.g. gasoline, gasohol, alcohol, diesel) through line 34 directly to the fuel air mixing chamber 8 or through line 36 to low temperature heat tank 16 and hence from there via line 38 to high temperature heat tank 18. From high temperature heat tank 18, the fuel, which may be partially or totally vaporized, passes via line 40 to valve 32 and hence therethrough to line 34 and to the engine (mixing chamber).

The exhaust from operation of the engine, exits via 42 to the high temperature heat tank 18 where it indirectly contacts the fuel. From there the exhaust passes via line 44 to the low temperature heat tank 16 where it again contacts the fuel indirectly (the fuel flowing contra to the exhaust gases) preferably after passing through booster fan 20, which may be powered by the engine 10 or by a separate power source (not shown). The booster fan increases the velocity of the exhaust gas.

After leaving low temperature heat tank 16, the exhaust gases pass via 46 to turbine 22 and hence from there to turbine 24 (additional turbines may be in series) via 48 and is finally emitted to the atmosphere (after appropriate treatment, i.e, catalytic converter or the like, which is not shown).

Hence by this arrangement, the waste heat is recovered and returned to the engine as energy in the preheated fuel and the compressive energy in the exhaust gases is recovered in the turbine(s).

As will be disclosed later the compressor, engine and turbines may be mounted to a common shaft or in various combinations on different shafts. The high temperature heat tank 18 may also be mounted to or be a part of the engine 10, whereby some of the heat of friction is also recovered in the preheated fuel.

The preheated fuel may be used as the sole fuel for operating the engine or may be blended with fuel from tank 12 as desired. In some embodiments on engine start up the unheated fuel from tank 12 will be employed and as the engine runs some portion of the fuel from tank 12 will go through the preheat sequence and be blended with the unheated fuel until all of the fuel can be passed through the preheating sequence.

Figure 2:
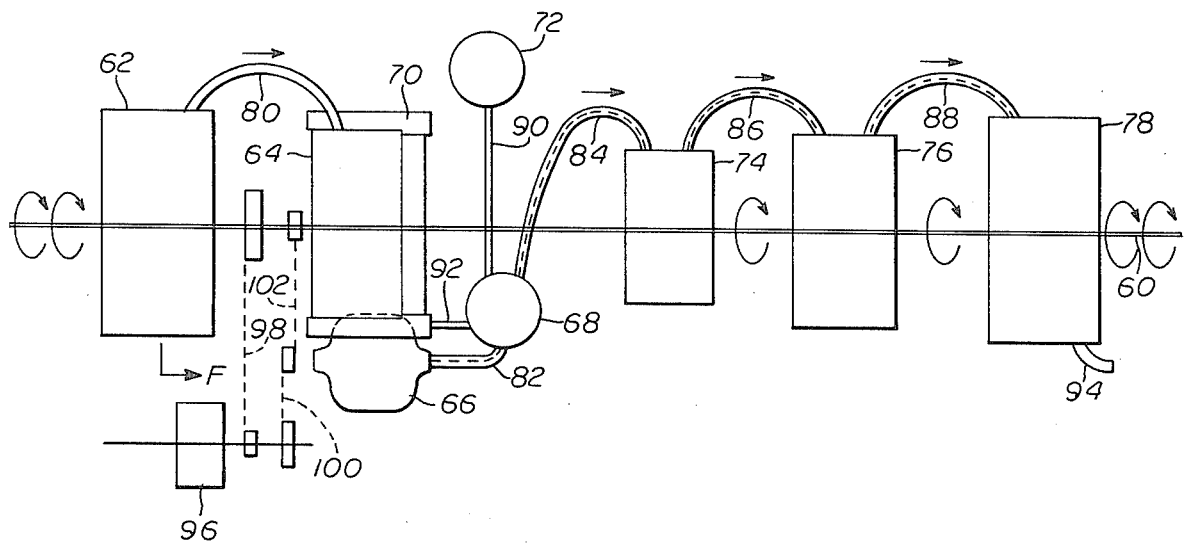
FIG. 2 is a schematic representation of one embodiment of a complete system according to the present invention wherein all of the elements thereof are arranged along a single drive shaft.

FIG. 2 shows a schematic representation of an embodiment of the present system with all of the components arrayed along and connected to a common drive shaft 60. An auxiliary power source 96 is shown connected by drive means 98 and 100 (e.g. pulleys and belts) to the compressor 62 and booster fan 66, respectively. Appropriate clutch means (not shown) could be included to disengage and allow the engine 64 to operate the compressor from the shaft 60 and the booster by drive means 102.

The compressor 62 is connected to the fuel-air mixing chamber (not shown) via line 80. The engine exhaust is attached to high temperature heat tank 70 (internally and not shown), which is a U-shaped unit mounted adjacent to the engine. The booster fan 66 is mounted adjacent to high temperature heat tank 70 and communicates thereto (internally and not shown). Line 82 carries the exhaust gases to low temperature heat tank 68 where fuel from tank 72 via line 90 indirectly contacts the gases then passes via line 92 to high temperature heat tank 70 to further indirectly contact the hot exhaust gases prior to entering the fuel air-mixing chamber for entry into the combustion chamber(s) (not shown) of the engine.

The partially cooled exhaust gases pass via line 84 to turbine 74, hence via line 86 to turbine 76 and via line 88 to turbine 78 and from there to the atmosphere via exhaust 94.

In full operation the engine 64 desirably will operate compressor 62 and booster 66 from the common drive shaft with additional power coming from compression energy recovered by turbines 74, 76, and 78, which are also connected to the shaft.

Figure 3:
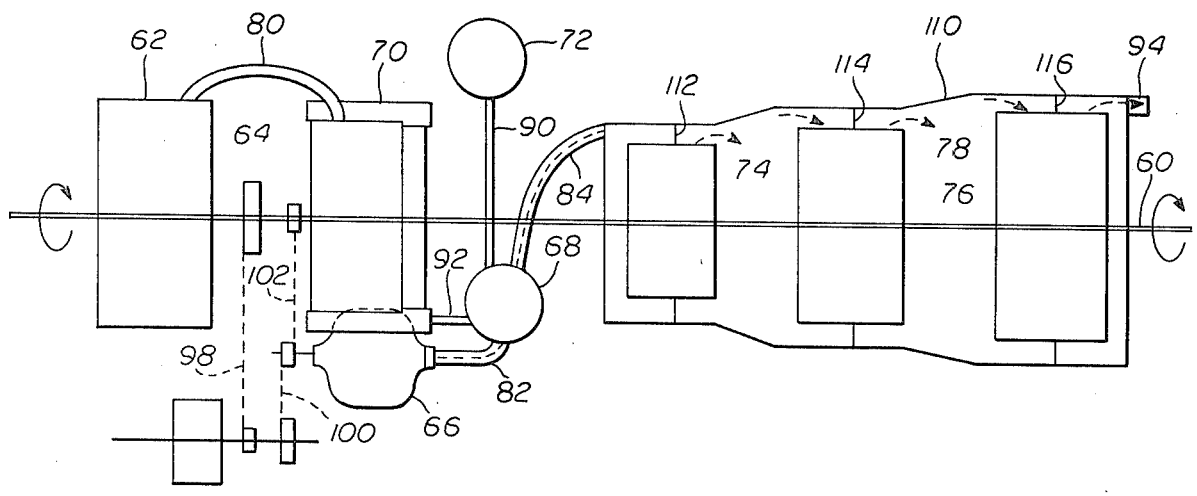
FIG. 3 is a schematic representation of a variation of the embodiment shown in FIG. 2.

Referring to FIG. 3 a modification of the embodiment shown in FIG. 2 is illustrated. The turbines 74, 76, and 78 are housed in a single housing 110. In order to direct the flow of exhaust gases into each turbine in sequence, annular walls 112, 114, and 116 extending from the internal surface of housing 110 to each turbine 74, 76, and 78, respectively separate entry and exit ports (not shown) on adjacent turbines.

Figure 4:
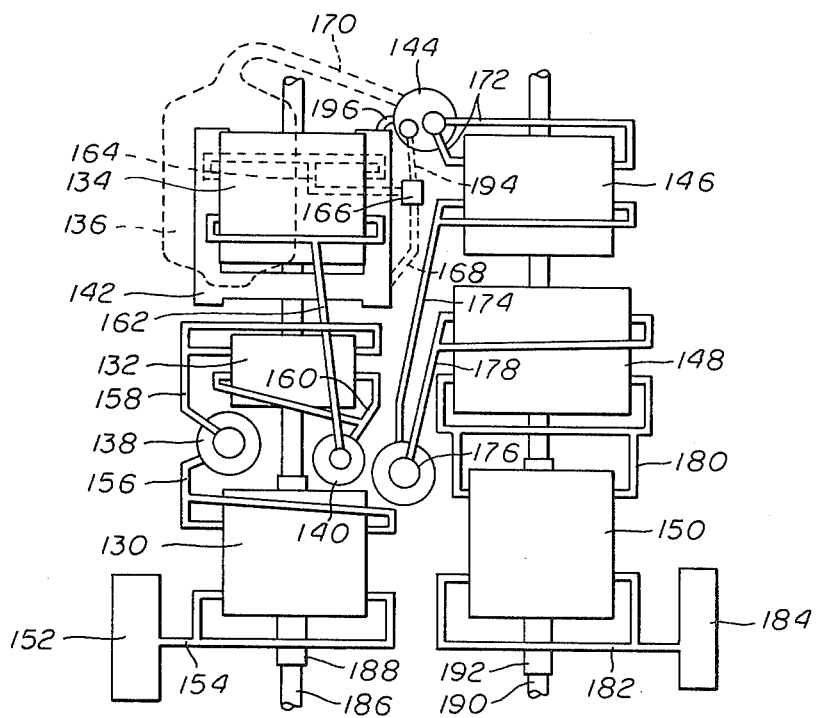
FIG. 4 is a schematic representation of one embodiment of a complete system according to the present invention wherein the elements thereof are arranged along two parallel drive shafts.

FIG. 4 demonstrates a side-by-side arrangement of components of the system on two drive shafts. In FIG. 4, the engine 134 and two compressors 132 and 130 are shown mounted along a common shaft 186. Compressor 130 is mounted to concentric shaft 188 and may be engaged with shaft 186 (by means not shown) or operated separately therefrom by an external power source (not shown). Compressor 130 is connected to air intake 152 (may be an air filter) via line 154. Line 156 conveys air compressed by compressor 132 where the air is further compressed and conveyed to tank 140 for entry via line 162 into the engine 134 (into an appropriate mixing chamber (not shown) where it mixes with incoming fuel for ignition in the engine.

The engine exhaust (not shown) is fed into high temperature heat tank 142 which is then communicated with booster fan 136 (shown by dotted lines). The booster fan 136, in turn, connects to low temperature heat tank 144 via line 170 where incoming fuel initially indirectly contacts the hot exhaust gases and by conventional heat exchange removes some of the heat from the exhaust gases.

The fuel tank is not depicted in this embodiment but valve 166 is connected thereto. As described earlier the liquid fuel is directed through the valve either via line 164 into admixture with the air for combustion in the engine, for example, in start up or through line 194 into the low temperature tank 144 and hence by line 196, into the high temperature tank 142 and therethrough after indirect contact with the exhaust gases through valve 166, where it may be admixed with cooler incoming fuel or may surplant that fuel into line 164 and subsequent admixture with the compressed air for ignition.

The cooled exhaust gases leave low temperature tank 144 via line(s) 172 to turbine 146 hence from there via line 174 to tank 176 which serves as a surge tank to feed the partially depleted exhaust gases via line 178 to turbine 148 with the gases exiting therefrom passing via line 180 to turbine 150 and hence exiting via line 182 and muffler 184 to the atmosphere. Turbines 146 and 148 are shown mounted to common shaft 190 and turbine 150 being mounted to the concentric shaft 192 which may be engagable (by means not shown) with shaft 190. It should be appreciated that all of the turbines may be mounted to shaft 190 or any two may be mounted to concentric shafts for optional engagement to the main drive shaft 190.

The two shafts 186 and 190 (and also concentric shafts 188 and 192) may be used independently or engaged through appropriate means not the subject of this invention to provide a single drive source.

Figure 5:
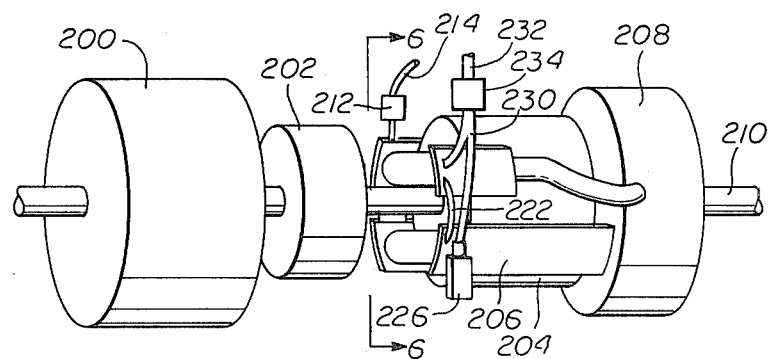
FIG. 5 is a perspective view of a compressor and power plant mounted to the same drive shaft.
Figure 6:
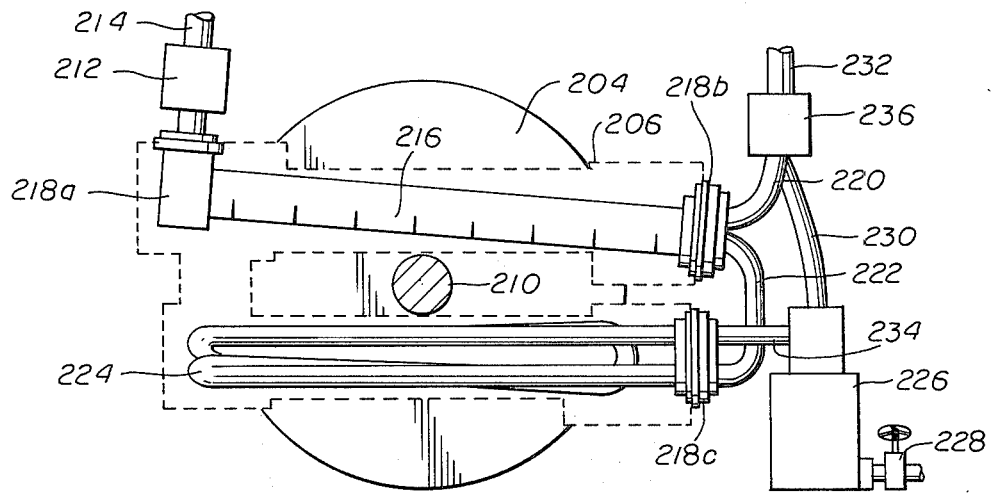
FIG. 6 is an elevational cross section taken along 6—6 of FIG. 5 showing the high temperature heating unit for preheating fuel.
Figure 7:
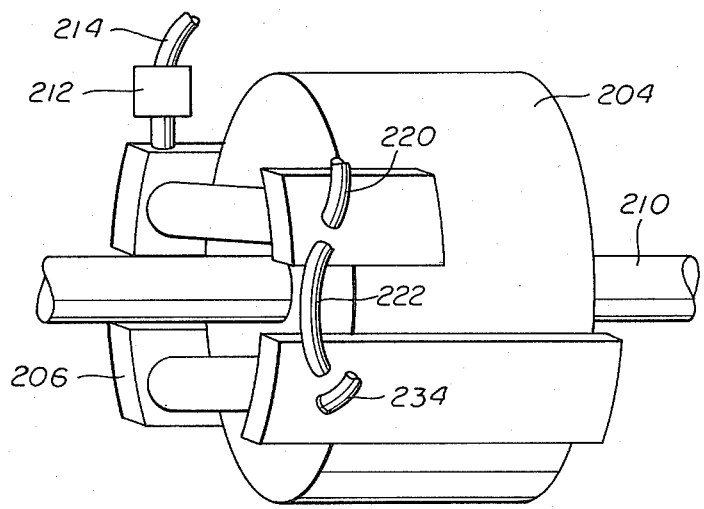
FIG. 7 is an enlarged perspective view of the engine of FIG. 6 with the high temperature heating unit mounted thereon.

In FIG. 5, the combination of two compressors 200 and 202, engine 204, high temperature heat tank 206 mounted thereto and a turbine 208 aligned along shaft 210. FIG. 6 taken along line 6—6 of FIG. 5 shows one configuration of high temperature heat tank. The fuel (preferably preheated in a low temperature heat tank) enters the high temperature heat tank 206 (dotted line) via line 214 through coupling 212 and fitting 218a into gasification chamber 216, where a portion of the fuel may be vaporized. The vaporized fuel passes out of the tank 206 via fitting 218b, line 220, coupling 236 and line 232. The portion of fuel still liquid passes via line 222 and fitting 218c into piping 224 for further gasification and hence through fitting 218c and line 234 to sump 226 where the liquid portions are collected and removed through valve 228 for recycle through the fuel heating cycle and the gaseous portion passes via line 230, couple 233 and line 232 for combustion in the engine. FIG. 7 is an isolation and enlargement of the engine 204 and high temperature heat tank 206, as shown in FIG. 5.

Figure 8:
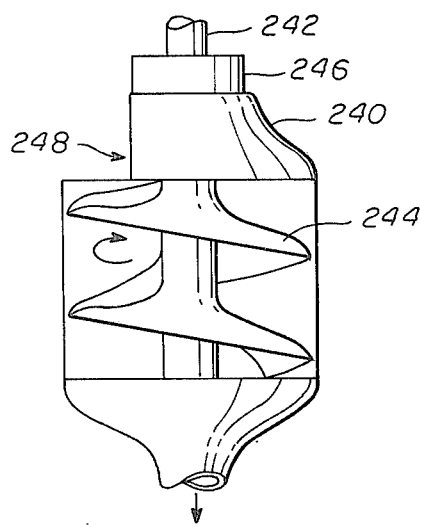
FIG. 8 is a partial cutaway view of the exhaust booster fan.
Figure 9:
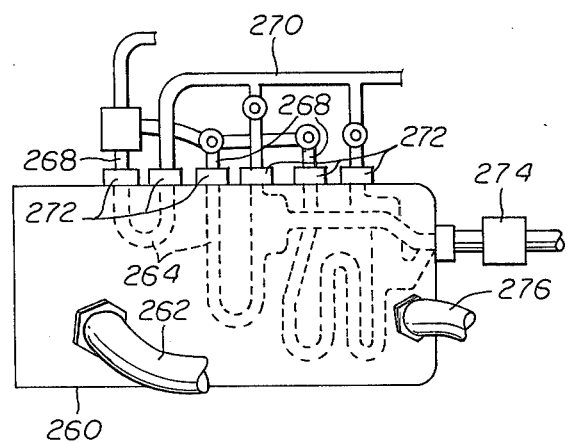
FIG. 9 is a side view of a low temperature unit for heating fuel prior to entry into a high temperature unit.

In FIG. 8., a partial cutaway view of one embodiment of a booster as discussed herein, is illustrated. The booster fan comprises a housing 240 which is adapted to seat onto and form a part of the high temperature heat tank at 248, thereby providing direct egress of the exhaust gases from that tank. The fan is a screw blade 244 mounted to shaft 242 which is rotated by a power source (not shown). The shaft and screw blade are supported in the housing by air tight bearing 246. The operation of the screw blade in the direction of the arrow forces the exhaust gases out through opening 250, for example, into the low temperature heat tank 260 shown in FIG. 9. The hot exhaust gases enter the tank 260 via conduit 262 attached thereto, and within the tank contact the piping 264 shown in dotted lines through which liquid fuel is flowing from the various entry ports 272 from line 270 and exiting through line 218 connected to exit ports 268. A gas relief valve 274 is provided in the piping 264. The vaporized fuel goes to an engine as described above. The exhaust gases pass out of the tank via conduit 276 attached thereto and may then be passed to a turbine or turbines as described.

Figure 10:
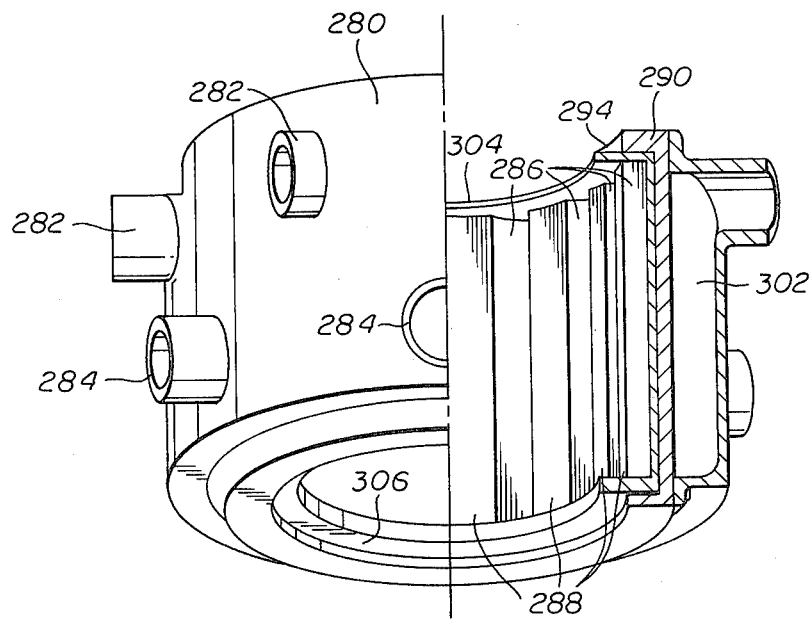
FIG. 10 is a perspective view of an embodiment of a turbine with partial cutaway of the housing.
Figure 11:
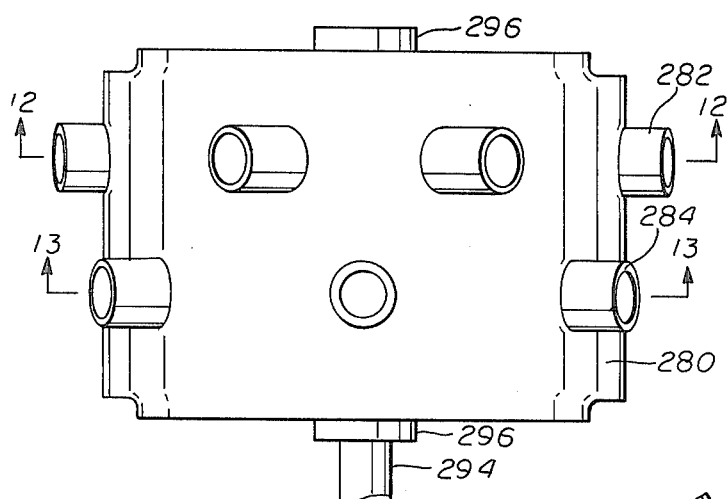
FIG. 11 is a top view of the turbine of FIG. 10.
Figure 12:
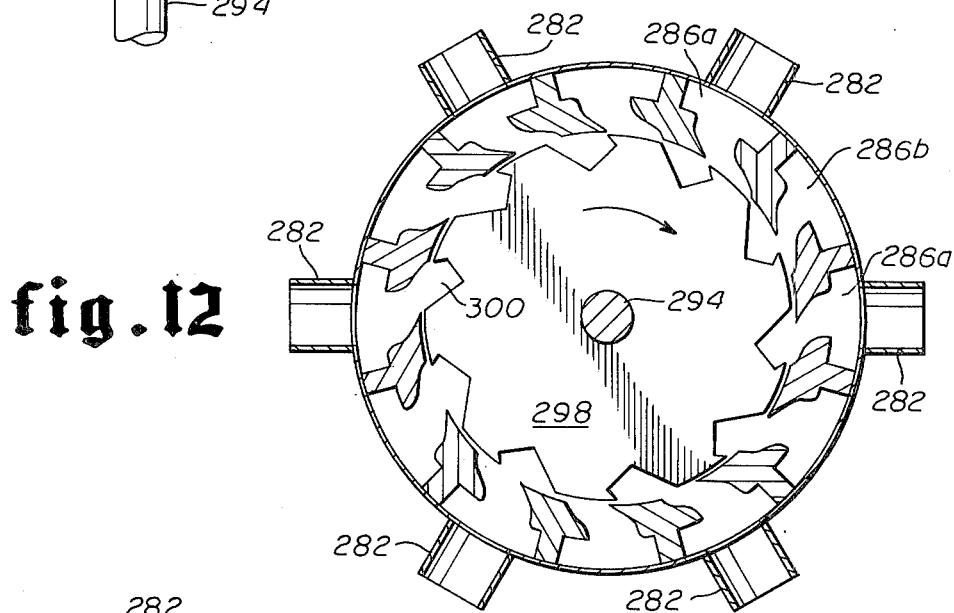
FIG. 12 is a view taken along line 12—12 of FIG. 11.
Figure 13:
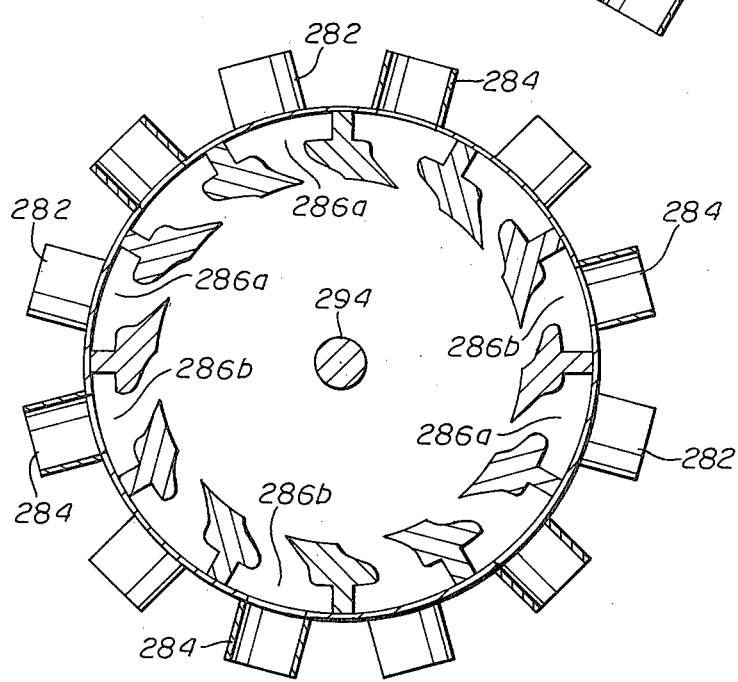
FIG. 13 is a view taken along line 13—13 of FIG. 11.

FIGS. 10-13 show one embodiment of turbine. FIGS. 10 and 11 show the turbine in perspective. FIGS. 12 and 13 are schematic and show other element relationships. The turbine has a circular cross-section and generally cylindrical shape. In FIG. 10, the outer housing 280 has attached thereon inlet ports 282 and outlet ports 284 which communicate with the interior of the turbine through channel 302, which is formed by the outer housing 280 and intermediate housing 290. Each inlet and outlet port is associated with a corresponding slot 286 extending through the intermediate housing 290 and inner shell 292. Members 288 form the slots which are tangential to the axis of said housing within the turbine and serve to direct the incoming gases against the pockets of flywheel 298 (FIG. 12). The annular walls 304 and 306 of the inner shell 294 are adapted to form a substantially air tight seal with a flywheel mounted therein.

In FIG. 12, which is a cross-sectional elevation along line 12—12 of FIG. 11, the flywheel 298 is shown in place in the interior of the turbine. The flywheel is mounted to shaft 294 and extends from annular wall 304 to annular wall 306. The shaft 294 is mounted through bearing rings 296 and rotable therein. The flywheel has a series of equidistant pockets 300 spaced about its outer surface. The pockets extend the length of the flywheel along the axis of the shaft and are adapted to correspond with the slots, such that as exhaust gases enter through ports 282 and channels 302, through slots 286, into pockets 300 of the flywheel and force the flywheel and shaft to rotate in the direction of the arrow (FIG. 12). Any given pocket 300 will alternately contact an entry port 282 and an outlet port 284 as the flywheel rotates, thus allowing the gases to pass through the turbine and rotate the shaft 294. The slots designated as 286a are associated with entry ports 282 and the slots designated 286b are associated with outlet ports 284.

Figure 15:
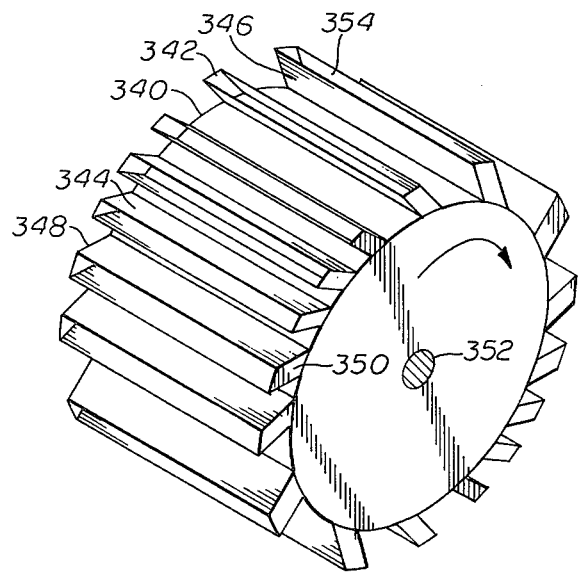
FIG. 15 is an alternative embodiment of turbine pocket construction.
Figure 16:
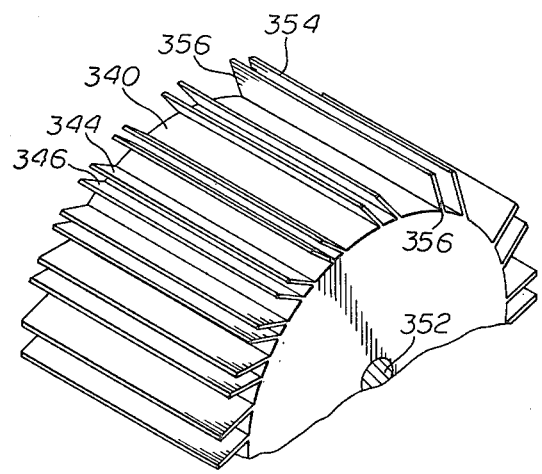
FIG. 16 is a modified version of the embodiment of FIG. 15 in a partial view.

In FIG. 15 the flywheel 340 is shown with a plurality of boxes 342 mounted thereto instead of pockets in the wheel. Each box 342 is comprised side members 344 and 346 and end members 348 and 350. Preferably as shown the boxes are trapezoidal, that is the end members 348 and 350 are trapezoids such that the side members are tangential to axis of the flywheel represented by shaft bore 352, such the exhaust gases drive the turbine in the direction of the arrow. The gas seal is formed between the turbine housing (such as shown in FIG. 13) and the pockets formed by the boxes is along the upper edge 354 of the box. The box is attached to the flywheel by welding or bolts not shown.

Figure 14:
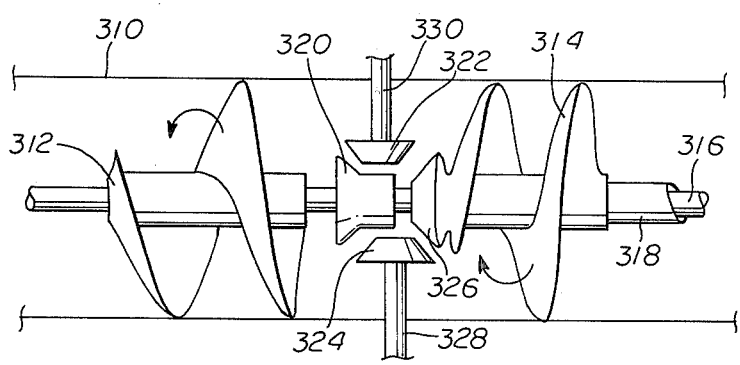
FIG. 14 is a top view of a screw compressor.

In the alternative configuration shown in FIG. 14, the pocket is formed by the side member 344 and 346 which are tangentially affixed to the flywheel 340 and the end members are omitted, thus the gas seal is formed by housing (not shown but as in FIG. 13) and upper edge 354 and side edges 356 of the side members.

In FIG. 14 a screw type compressor is depicted. Compression of gases, e.g. air, is obtained by screw gears 312 and 314 rotating on shaft 316 and concentric shaft 318 respectively within cylindrical chamber 310. Screws 312 and 314 have mirror configurations thus by operating the two in reverse directions as indicated by the arrows, the flow of compressed gas is to the right of the drawing. The blades of the two screws form very tight seals with inner surface of chamber 310. The screws may be driven either by shafts 316 and 318 each being rotated by a power source (not shown) in the appropriate direction, or by engaging the bevel gear 322 engaged to bevel gear 320, which will rotate shaft 316 and screw 312 by power supplied through rotation of shaft 320 by a power source (not shown) and by engaging bevel gear 324 on shaft 328 with bevel gear 326 which will rotate screw 314 by a power source (not shown), rotating shaft 318. This could be used in start up of a system as described herein with shafts 316 and 318 being disengaged from any power source, and once the system is operating, i.e., the engine component thereof operating, the shafts 316 and 318 could be engaged to the engine by appropriate gearing and clutches (not shown) and the bevel gears 322 and 324 disengaged from gears 320 and 326 respectively.

Alternately, the bevel gears 322 and 324 may be left engaged to bevel gears 320 and 326, respectively, when the screws are powered via shafts 316 and 318 and energy can be recovered through shafts 328 and 330.

It can be readily appreciated that various seals, washer, nuts, welds, and the like have not been noted, however, these are conventional.

The invention claimed is:

1. A power system comprising:
   (a) an internal combustion engine,
   (b) a compressor means operably connected to said engine for delivering compressed air to said engine for combustion in admixture with a fuel in a combustion chamber thereof,
   (c) a high temperature heat tank means operably connected to the exhaust of said engine for receiving engine exhaust gases therein,
   (d) a low temperature heat tank means operably connected to said high temperature heat tank means for receiving therein engine exhaust gases from said high temperature heat tank means,
   (e) a booster fan means operably connected between said high temperature heat tank means and low temperature heat tank means for increasing the flow of exhaust gases from said high temperature heat tank means into said low temperature heat tank means,
   (f) a gas turbine means operably connected to said low temperature heat tank means for receiving therein engine exhaust gases from said low temperature heat tank means, for recovery compression energy from exhaust gases,
   (g) a fuel tank means, and
   (h) a fuel line extending from said fuel tank means through said low temperature heat tank means and thereafter through said high temperature heat tank means for indirect contact of fuel in said fuel line with engine exhaust gases, for heating said fuel, whereby said hot exhaust gases are partially cooled before passing through said booster fan means, and further cooled thereafter, and operably connected to said engine for delivering preheated fuel to said engine for combustion in admixture with air in a combustion chamber thereof.

2. The power system according to claim 1, wherein said turbine means comprises at least two turbines connected in series whereby exhaust gases pass into a first turbine and from there into a succeeding turbine.

3. The power system according to claim 2, wherein said turbines are arrayed along a common drive shaft and connected thereto for rotating said drive shaft as exhaust gases pass through said turbines.

4. The power system according to claim 3, wherein said engine, compressor means, and turbine means are arrayed along and connected to a common drive shaft.

5. The power system according to claim 1, wherein said compressor means comprises at least two compressors in series.

6. The power system according to claim 1, wherein said compressor means comprises at least two compressors in series and arrayed along and connected to a common drive shaft with said engine and said turbine means comprising at least three turbines connected in series whereby exhaust gases pass into a first turbine and from there into a second turbine and then into a third turbine, said turbines being arrayed along a common drive shaft for rotating said shaft as exhaust gases pass through said turbine means.

7. The power system according to claim 1, where said compressor means has an air intake means and said turbine means has an exhaust means.

8. A method of operating an internal combustion engine comprising:
   (a) compressing air,
   (b) feeding said compressed air to a mixing chamber for admixture with a fuel, feeding said mixture of compressed air and fuel into a combustion chamber of said engine,
   (c) thereafter pre-heating a fuel by indirect contact of said fuel with exhaust gases of said engine,
   (d) feeding said mixture of compressed air and preheated fuel into a combustion chamber of said engine,
   (e) combusting said mixture in said combustion chamber,
   (f) recovering the combustion gases,
   (g) indirectly contacting said combustion gases with said fuel in a first high temperature zone,
   (h) increasing the velocity of said combustion gases, and
   (i) thereafter indirectly contacting said combustion gases from said first zone with said fuel in a second low temperature zone.

9. The method according to claim 8, wherein said combustion gases are recovered from said low temperature zone and drive a turbine.

10. The method according to claim 8, wherein said compression of air is carried out in two stages.

11. The method according to claim 8, wherein said fuel is a liquid and said preheated fuel is gaseous.

12. A power system comprising:
   (a) an internal combustion engine,
   (b) a compressor means operably connected to said engine for delivering compressed air to said engine for combustion in admixture with a fuel in a combustion chamber thereof,
   (c) a high temperature heat tank means operably connected to the exhaust of said engine for receiving engine exhaust gases therein,
   (d) a low temperature heat tank means operably connected to said high temperature heat tank means for receiving therein engine exhaust gases from said high temperature heat tank means,
   (e) a booster fan means operably connected between said high temperature heat tank means and low temperature heat tank means for increasing the flow of exhaust gases from said high temperature heat tank means into said low temperature heat tank means,
   (f) a fuel tank means, and
   (g) a fuel line extending from said fuel tank means through said low temperature heat tank means and said high temperature heat tank means for indirect contact of fuel in said fuel line with engine exhaust gases, for heating said fuel, and operably connected to said engine for delivering preheated fuel to said engine for combustion in admixture with air in a combustion chamber thereof.

* * * * *